United States Patent
Wu et al.

(10) Patent No.: US 12,033,304 B2
(45) Date of Patent: Jul. 9, 2024

(54) METHOD FOR MARKING FOCUSED PIXEL, ELECTRONIC DEVICE, STORAGE MEDIUM, AND CHIP

(71) Applicant: BOE Technology Group Co., Ltd., Beijing (CN)

(72) Inventors: Congrui Wu, Beijing (CN); Xitong Ma, Beijing (CN); Lihua Geng, Beijing (CN); Ran Duan, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 421 days.

(21) Appl. No.: 17/533,977

(22) Filed: Nov. 23, 2021

(65) Prior Publication Data
US 2022/0174222 A1    Jun. 2, 2022

(30) Foreign Application Priority Data
Nov. 30, 2020   (CN) .......................... 202011379645.2

(51) Int. Cl.
*G06T 5/50*     (2006.01)
*G06T 5/20*     (2006.01)
*G06T 5/70*     (2024.01)

(52) U.S. Cl.
CPC .................. *G06T 5/50* (2013.01); *G06T 5/20* (2013.01); *G06T 5/70* (2024.01); *G06T 2207/20032* (2013.01)

(58) Field of Classification Search
CPC .... G06T 5/50; G06T 5/20; G06T 5/70; G06T 2207/20032; H04N 23/80; H04N 23/67; H04N 17/002
See application file for complete search history.

(56) References Cited

U.S. PATENT DOCUMENTS

2005/0056767 A1*  3/2005  Kaplan ............... G02B 21/245
                                             250/208.1
2015/0288957 A1   10/2015  Baker
(Continued)

FOREIGN PATENT DOCUMENTS

CN    101217623 A    7/2008
CN    103413328 A   11/2013
(Continued)

OTHER PUBLICATIONS

Wenyan, Zhu, Zhou Lianqun, and Zhang Zhiqi. "Autofocus of microarray digital PCR fluorescent chip." Optics and Precision Engineering 28.9 (2020): 2065-2075.
(Continued)

*Primary Examiner* — Carol Wang
(74) *Attorney, Agent, or Firm* — IPro, PLLC

(57) ABSTRACT

Provided is a method for marking a focused pixel. The method includes: in response to marking a focused pixel of a first image based on a focus threshold, adjusting the focus threshold in the case that an adjustment condition is satisfied; marking a focused pixel of a second image based on the adjusted focus threshold. The adjustment condition includes: a focus degree of the first image is less than a target focus degree, and/or, the focus degree of the first image is greater than the target focus degree. Moreover, a similarity between the first image and the second image is greater than a similarity threshold, and a difference between a focus degree of the second image and the target focus degree is less than a difference between the focus degree of the first image and the target focus degree.

19 Claims, 2 Drawing Sheets

Marking a focused pixel of a first image based on a focus threshold — S10

Adjusting the focus threshold in the case that an adjustment condition is satisfied, wherein the adjustment condition includes at least one of: a focus degree of the first image being less than a target focus degree, and the focus degree of the first image being greater than the target focus degree; wherein a focus degree of an image is positively correlated with a number of focused pixels of the image — S20

Marking a focused pixel of a second image based on the adjusted focus threshold — S30

(56) References Cited

U.S. PATENT DOCUMENTS

| | | | |
|---|---|---|---|
| 2018/0164542 A1 | 6/2018 | Wakazono | |
| 2021/0281738 A1* | 9/2021 | Jeppsson | ................ H04N 7/18 |

FOREIGN PATENT DOCUMENTS

| | | | | |
|---|---|---|---|---|
| CN | 103945126 A | | 7/2014 | |
| CN | 104980649 A | | 10/2015 | |
| CN | 105959533 A | | 9/2016 | |
| CN | 106201238 A | | 12/2016 | |
| CN | 106448546 A | | 2/2017 | |
| CN | 109041590 A | | 12/2018 | |
| CN | 112887610 A | * 6/2021 | ......... H04N 5/23212 |
| EP | 2335404 B1 | * 10/2016 | ......... H04N 5/23212 |
| JP | H10170817 A | | 6/1998 | |
| WO | 2016203692 A1 | | 12/2016 | |

OTHER PUBLICATIONS

CN202011379645.2 first office action.

\* cited by examiner

METHOD FOR MARKING FOCUSED PIXEL, ELECTRONIC DEVICE, STORAGE MEDIUM, AND CHIP

CROSS-REFERENCE TO RELATED APPLICATION

This application claims priority to Chinese Patent Application No. 202011379645.2, filed on Nov. 30, 2020 and entitled "METHOD AND APPARATUS FOR MARKING FOCUSED PIXEL, AND ELECTRONIC DEVICE," the disclosure of which is incorporated herein by reference in its entirety.

TECHNICAL FIELD

The present disclosure relates to a method for marking a focused pixel, an electronic device, a storage medium and a chip.

BACKGROUND

A video camera is a device for shooting a video or an image. Generally, the video camera includes a monitor, or the video camera is externally connected to a monitor independently set. When a videographer shoots with the camera, the videographer may see a viewfinder image displayed on the monitor to clearly observe a shooting scene.

SUMMARY

Embodiments of the present disclosure provide a method for marking a focused pixel, an electronic device, a storage medium, and a chip.

According to a first aspect of the embodiments of the present disclosure, a method for marking a focused pixel is provided.

The method includes: marking a focused pixel of a first image based on a focus threshold; adjusting the focus threshold in the case that an adjustment condition is satisfied, wherein the adjustment condition includes at least one of: a focus degree of the first image being less than a target focus degree, and the focus degree of the first image being greater than the target focus degree; wherein a focus degree of an image is positively correlated with a number of focused pixels of the image; and marking a focused pixel of a second image based on the adjusted focus threshold;
wherein a similarity between the first image and the second image is greater than a similarity threshold, and a difference between a focus degree of the second image and the target focus degree is less than a difference between the focus degree of the first image and the target focus degree; and
a focus parameter of the focused pixel of the first image is greater than the focus threshold, and a focus parameter of the focused pixel of the second image is greater than the adjusted focus threshold; or a focus parameter of the focused pixel of the first image is less than the focus threshold, and a focus parameter of the focused pixel of the second image is less than the adjusted focus threshold.

In some embodiments, adjusting the focus threshold includes: adjusting the focus threshold based on a ratio of the target focus degree to the focus degree of the first image.

In some embodiments, in the case that the focus parameter of the focused pixel of the first image is greater than the focus threshold, the adjusted focus threshold G2 is equal to G1/u; or in the case that the focus parameter of the focused pixel of the first image is less than the focus threshold, the adjusted focus threshold G2 is equal to u*G1; wherein u represents the ratio, and G1 represents the focus threshold.

In some embodiments, the method further includes: acquiring the focus degree of the first image by performing weighted averaging on focus parameters of pixels of the first image.

In some embodiments, upon the weighted averaging, a weight of the focus parameter of the focused pixel is greater than a weight of a focus parameter of an unfocused pixel, wherein the unfocused pixel is different from the focused pixel.

In some embodiments, the focus parameter is a pixel gradient; and a pixel gradient of the focused pixel of the first image is greater than the focus threshold, and a pixel gradient of the focused pixel of the second image is greater than the adjusted focus threshold.

In some embodiments, the method further includes: receiving a focus degree instruction, wherein the focus degree instruction indicates the target focus degree; and determining the target focus degree based on the focus degree instruction.

In some embodiments, the first image is a $k^{th}$ image frame of a video, and the second image is a $(k+n)^{th}$ image frame of the video, wherein $k \geq 1$ and $n \geq 1$.

In some embodiments, in the case that k is greater than 1, the method further includes: performing, based on an adjacent image frame of any image frame of the video, inter-frame denoising on the any image frame prior to marking a focused pixel of the any image frame.

In some embodiments, performing, based on the adjacent image frame of the any image frame of the video, inter-frame denoising on the any image frame includes: replacing a value of each pixel of the any image frame with a mean value corresponding to each pixel; wherein the mean value corresponding to a pixel in an $i^{th}$ row and a $j^{th}$ column of the any image frame is a mean value of a value of the pixel and a value of a pixel in an $i^{th}$ row and a $j^{th}$ column of a preceding image frame of the any image frame, wherein the $i \geq 1$ and the $j \geq 1$.

In some embodiments, the method further includes: prior to marking a focused pixel of the any image frame, performing dark-field denoising on the any image frame in the case that luminance of the any image frame is less than a first luminance threshold.

In some embodiments, the method further includes: acquiring luminance of a plurality of image regions of the any image frame; and determining the luminance of the any image frame based on the luminance of the plurality of image regions.

In some embodiments, denoising the any image frame includes: performing the dark-field denoising on any image region of the plurality of image regions in the case that the luminance of the any image region is less than a second luminance threshold.

In some embodiments, the dark-field denoising includes median filtering denoising.

In some embodiments, the focus parameter is a pixel gradient; and a pixel gradient of the focused pixel of the first image is greater than the focus threshold, and a pixel gradient of the focused pixel of the second image is greater than the adjusted focus threshold; wherein the adjusted focus threshold G2 is equal to G1/u, u represents a ratio of the target focus degree to the focus degree of the first image, and G1 represents the focus threshold; and the method further includes: receiving a focus degree instruction, wherein the focus degree instruction indicates the target focus degree; determining the target focus degree based on the focus degree instruction; acquiring luminance of a plurality of image regions of the any image frame, in response to performing the inter-frame denoising on the any image frame; determining, based on the luminance of the plurality of image regions, the luminance of the any image frame undergoing the inter-frame denoising; performing median filtering denoising on any image region of the plurality of image regions in the case that the luminance of the any image frame undergoing the inter-frame denoising is less than a first luminance threshold and the luminance of the any image region is less than a second luminance threshold; and acquiring the focus degree of the first image by performing weighted averaging of focus parameters of pixels of the first image; wherein upon the weighted averaging, a weight of the focus parameter of the focused pixel is greater than a weight of a focus parameter of an unfocused pixel, wherein the unfocused pixel is different from the focused pixel.

According to a second aspect of the embodiments of the present disclosure, an electronic device is provided. The electronic device includes a processor and a memory storing a computer program loadable and runnable on by the processor, wherein the processor, when loading and running the computer program, is caused to perform any one of methods for marking the focused pixel as defined in the first aspect.

In some embodiments, the electronic device is a monitor.

According to a third aspect of the embodiments of the present disclosure, a non-transitory computer-readable storage medium storing one or more computer instructions therein is provided. The one or more computer instructions, when loaded and executed by a processor of an electronic device, cause the electronic device to perform any one of methods for marking the focused pixel as defined in the first aspect.

According to a fourth aspect of the embodiments of the present disclosure, a chip including at least one of a programmable logic circuit and a program instruction is provided, wherein the chip, when running, is caused to perform any one of methods for marking the focused pixel as defined in the first aspect.

DETAILED DESCRIPTION

For clearer descriptions of the principles and technical solutions of embodiments of the present disclosure, the embodiments of the present disclosure are described clearly and completely hereinafter with reference to the accompanying drawings. Apparently, the embodiments described hereinafter are merely some embodiments of the present disclosure. Based on the embodiments in the present disclosure, any other embodiments acquired by those skilled in the art without creative efforts are within the protection scope of the present disclosure.

Figure 1:
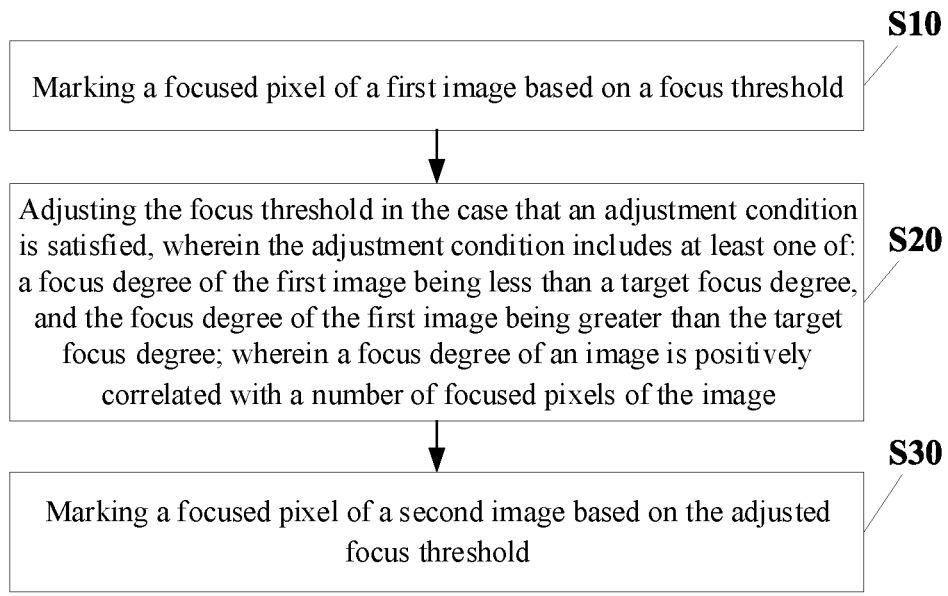
FIG. 1 is a first flowchart of a method for marking a focused pixel according to an embodiment of the present disclosure.

The embodiments of the present disclosure provide a method for marking a focused pixel. Referring to FIG. 1, the method includes the following processes.

In S10, a focused pixel of a first image is marked based on a focus threshold.

The method for marking a focused pixel according to the embodiments of the present disclosure may be applied to mark a focused pixel of a viewfinder image acquired by a photography device, wherein the photography device may be a mobile phone, a camera, a video camera, or the like. The method may be applicable to a device for marking a focused pixel (for example, the device is a monitor), wherein the device is connected to the photography device. The device marks an edge outline of a focused region in the viewfinder image (a region where a focused object is located) by analyzing the viewfinder image collected by the photography device in real time. In this way, a visible focused position and visible focus quality of the viewfinder image may be achieved, such that an objective and visual determination of focus effect may be provided to the videographer, thereby avoiding the difficulty for the videographer to accurately determine the focus effect of the viewfinder image; wherein the difficulty is due to the interference of external factors such as environment, light, distance and the like.

In this embodiment, the first image in S10 is a viewfinder image frame of a viewfinder video acquired by photography device. In other embodiments, the method for marking a focused pixel may be applied to mark a focused pixel of a video image of a video file, that is, analyzing focused objects in an existing video file is performed, thereby facilitating post-processing and shooting research. The first image is a video frame of the video file.

The focus threshold is a threshold of a focus parameter of a pixel. The focus parameter of the pixel is a parameter for determining whether the pixel is focused. In S10, an electronic device may first acquire focus parameters of pixels of the first image, determine a focused pixel of the first image based on the focus parameters and the focus threshold, and mark the focused pixel. The focus parameter of the focused pixel of the first image is greater than the focus threshold, or the focus parameter of the focused pixel of the first image is less than the focus threshold.

Exemplarily, the focus parameter of the pixel may be a pixel gradient of the pixel. In this case, a pixel gradient of the focused pixel of the first image is greater than the focus threshold. The pixel gradient can reflect a change in grayscales of a pixel and adjacent pixels, such that the pixel gradient can reflect a focus degree of the pixel. The pixel gradient of the pixel is greater, the focus degree of the pixel is greater; and the pixel gradient of the pixel is less, the focus degree of the pixel is less.

The pixel gradient of the pixel indicates the difference between the pixel and the adjacent pixels. In some embodiments, the focus parameter of the pixel may further be a parameter to represent indicating the similarity between the pixel and the adjacent pixels. In this case, the focus parameter of the focused pixel of the first image is less than the focus threshold.

The pixel gradient of the pixels of the first image may be acquired by calculating in various ways, for example, the pixel gradient of the pixels may be acquired through an edge detection algorithm. In some embodiments, the pixel gradient of the pixels of the first image is acquired by gradient filtering the pixels of the first image with a gradient convolution kernel of 3*3.

The focus threshold is a criterion for determining whether the pixel is focused. In the case that the pixel gradient of the pixel is greater than the focus threshold, the pixel is a pixel successfully focused (referred to as the focused pixel). The device for marking the focused pixel may mark the focused pixel. For example, the device may replace a pixel value of the pixel with a marking color pixel value, to make the pixel display the marking color. The marking color is generally an obvious color, such as red, green, blue, or the like. In addition, the marking color may be determined based on the first image, wherein the marking color is determined to be significantly different from a color of the first image.

In the case that the pixel gradient of the pixel is less than or equal to the focus threshold, the pixel is not the focused pixel. The device for marking the focused pixel may not process the pixel value of the pixel.

In the case that the comparison of the pixel gradients of all pixels of the first image with the focus threshold are completed and the focused pixel of the first image is marked, the device for marking the focused pixel may output the first image marked with the focused pixel. For example, the device displays the first image marked with the focused pixel, or sends the first image marked with the focused pixel to a display device to display.

In S10, the device for marking the focused pixel may mark all of the focused pixels of the first image. In the case that the device for marking the focused pixel marks the focused pixels of the first image, the better the focus effect of the first image is, the more dense and clear the marked focused pixels are; and the worse the focus effect of the first image is, the more sparse and dark the marked focused pixels are. Therefore, the user may determine the focus quality of the first image by observing the marking situation of the pixels of the first image output by the device for marking the focused pixels.

In S20, the focus threshold is adjusted in the case that an adjustment condition is satisfied, wherein the adjustment condition includes at least one of: a focus degree of the first image being less than a target focus degree, and the focus degree of the first image being greater than the target focus degree; wherein a focus degree of an image is positively correlated with a number of focused pixels of the image.

The focus degree is a parameter indicating a number of focused pixels of an image under a certain focus threshold. The greater the focus degree is, the more the marked focused pixels of the image are.

The target focus degree is a predetermined focus degree. The target focus degree indicates a number of focused pixels of an image required under a certain focus threshold. The target focus degree may be a focus degree determined in the device for marking the focused pixel by the user. The user may adjust the target focus degree, to adjust the number of focused pixels under a current focus threshold based on the requirement of the user, thereby accommodating to different shooting environments and different shooting demands.

In S20, the device for marking the focused pixel may first determine the focus degree of the first image, and then compare the focus degree of the first image with the target focus degree to determine whether the adjustment condition is satisfied.

The focus degree of the first image is a parameter indicating a number of focused pixels of the first image under a certain focus threshold. It is understandable that, the greater the focus degree is, the more the marked focused pixels of the first image is.

In some embodiments, the focus degree of the first image may be acquired by performing weighted averaging on the pixel gradients of all pixels of the first image. In some embodiments, in order to reflect the weight of the pixel gradient of the focused pixel, upon the weighted averaging, a weight of the pixel gradient of the focused pixel is generally greater, and a weight of an unfocused pixel (which is different from the focused pixel) is generally less. That is, the weight of the pixel gradient of the focused pixel of the first image is greater than the weight of the pixel gradient of the unfocused pixel upon performing weighted averaging on pixel gradients of all the pixels of the first image. In this way, the correlation between the focus degree of the first image and the pixel gradients of the focuses pixels is higher, and the influence of the pixel gradient of the unfocused pixels on the focus degree of the first image is less, thereby improving the accuracy of the focus degree of the first image.

The adjustment condition includes at least one of: the focus degree of the first image being less than the target focus degree, and the focus degree of the first image being greater than the target focus degree. In other words, the adjustment condition may be that the focus degree of the first image being less than the target focus degree, the focus degree of the first image being greater than the target focus degree, or the focus degree of the first image is different from the target focus degree.

The focus parameter of the focused pixel of the first image being greater than the focus threshold is taken as an example for illustration. In the case that the focus degree of the first image is greater than the target focus degree, it is indicated that the focus threshold determined in S10 is low, and the device for marking the focused pixel may increase the focus threshold to make the determination of focused pixels more stringent, thereby reducing the quantity of the focused pixels of the image, decreasing the focus degree of the image, and further avoiding an appearance of large-area marked focused pixels of the image.

In the case that the focus degree of the first image is less than the target focus degree, it is indicated that the focus threshold determined in S10 is high, and the device for marking the focused pixel may decrease the focus threshold to make the determination of focused pixels more loose, thereby increasing the quantity of the focused pixels of the image, increasing the focus degree of the image, and further avoiding the loss of the marked focused pixels of the image It can be seen from the above illustrations that, in the method for marking a focused pixel according to the embodiments of the present disclosure, in response to marking the focused pixel of the first image, the device for marking the focused pixel can automatically adjust the focus threshold based on the focus degree of the current first image and the target focus degree, thereby facilitating more accurately marking a focused pixel of the next image. A focused pixel of the next image can be concentrated in an image region with the highest focus degree, and the situations of the loss of the marked focused pixel of the image or the appearance of the large-area marked focused pixels of the image are avoided. Thus, the method for marking the focused pixel is applicable to different shooting scenes, and the accuracy of marking the focused pixels is improved.

In addition, the user may further adjust the target focus degree manually. By increasing or decreasing the target focus degree, manual control of the value of the focus threshold can be achieved, such that the accuracy of marking the focused pixel of the image can be improved with the combination of dynamic adjustment and manual adjustment.

In some embodiments, the device for marking the focused pixel may adjust the focus threshold based on a ratio of the target focus degree to the focus degree of the first image. For example, in the case that the focus parameter of the focused pixel of the first image is less than the focus threshold, the adjusted focus threshold G2 is equal to u*G1; wherein G1 represents the focus threshold, G2 represents an adjusted focus threshold, and the u represents the ratio of the target focus degree to the focus degree of the first image. For another example, in the case that the focus parameter of the focused pixel of the first image is greater than the focus threshold, the adjusted focus threshold G2 is equal to G1/u; wherein G1 represents the focus threshold, G2 represents the adjusted focus threshold, and u represents the ratio of the target focus degree to the focus degree of the first image.

In S30, a focused pixel of a second image is marked based on the adjusted focus threshold.

The similarity between the first image and the second image is greater than a similarity threshold. For example, the first image and the second image are two image frames of a same video, wherein the first image is a $k^{th}$ image frame of the video, and the second image is a $(k+n)^{th}$ image frame of the video, k≥1 and n≥1. For example, n is equal to 1, 3, 10, or the like. In the case that the first image and the second image are two image frames of the same video, the two image frames are close to each other, and content of the two image frames are similar. For example, the first image and the second image are two image frames that are timing adjacent of the video.

As the similarity between the first image and the second image is greater than the similarity threshold, in response to adjusting the focus threshold based on the focus degree of the first image, the adjusted focus threshold is applicable to the second image. A difference between a focus degree of the second image and the target focus degree is less than a difference between the focus degree of the first image and the target focus degree. For example, the focus degree of the second image is equal to the target focus degree. In this case, the focus degree of the second image can be more close to the target focus degree required by the user.

Similar to the focused pixel of the first image, a focus parameter of the focused pixel of the second image is greater than the adjusted focus threshold, or the focus parameter of the focused pixel of the second image is less than the adjusted focus threshold. In the case that the focus parameter is the pixel gradient, a pixel gradient of the focused pixel of the second image is greater than the adjusted focus threshold.

The process of determining, by the device for marking the focused pixel, the focused pixel of the second image may refer to the process of determining the focused pixel of the first image by the device. In response to determining the focused pixel of the second image, the device may mark the focused pixel of the second image. The process of marking the focused pixel of the second image may refer to the process of marking the focused pixel of the first image.

In the method for marking the focused pixel according to the embodiments of the present disclosure, in response to marking the focused pixel of the first image, the device for marking the focused pixel can automatically adjust the focus threshold based on the ratio of the target focus degree to the focus degree of the first image, and mark the focused pixel of the second image based on the adjusted focus threshold. Since the difference between the focus degree of the second image and the target focus degree is less than the difference between the focus degree of the first image and the target focus degree, the focus degree of the second image is close to the target focus degree, thereby facilitating accurately marking the focused pixel of the second image. The focused pixel of the second image is concentrated in an image region with the highest focus degree, and the situations of the loss of the marked focused pixel of the second image or the appearance of the large-area marked focused pixels of the second image are avoided. In this way, the method for marking the focused pixel is applicable to different shooting scenes, and the accuracy of marking the focused pixels is improved.

Furthermore, in the case that an acquisition device, such as a charge coupled device (CCD) of the photography device, acquires the first image and the second image, a random electronic noise is easily introduced, wherein the random electronic noise is visually represented as the random noise on the image. The noise becomes worse in the dark field as the aperture of the photography device becomes larger, thereby easily causing the interference on marking the focused pixel.

The method for marking the focused pixel according to the embodiments of the present disclosure further includes denoising (the denoising includes at least one of inter-frame denoising and dark-field denoising). The inter-frame denoising removes fundamental noise (such as the noise excluding the noise introduced by the dark field environment). The dark-field denoising removes the noise introduced by the dark field environment. The inter-frame denoising and the dark-field denoising may be cascaded. The inter-frame denoising may be first performed, and then the dark-field denoising is performed on the result of performing the inter-frame denoising; or the dark-field denoising may be first performed, and then the inter-frame denoising is performed on the result of performing the dark-field denoising.

It should be noted that the denoising in the embodiments of the present disclosure is not directly reflected on the displayed image. By utilizing the denoised image acquired by denoising the image, the focused pixel of the original image may be determined, and then the focused pixel of the original image may be marked, such that the interference of the noise on marking the focused pixel can be reduced. Generally, in order to actually restoring the shooting scene by the viewfinder image, the denoised image is not displayed.

In some embodiments, prior to marking the focused pixel of the any image frame in the first image and the second image, the method for marking the focused pixel further includes the following processes.

A value of each pixel of the any image frame is replaced with a mean value corresponding to each pixel. The mean value corresponding to a pixel in an $i^{th}$ row and a $j^{th}$ column of the any image frame is a mean value of a value of the pixel and a value of a pixel in an $i^{th}$ row and a $j^{th}$ column of a preceding image frame of the any image frame, and wherein i≥1 and j≥1.

For example, in the case that the first image is the $k^{th}$ image frame of the video, and k is greater than 1, the device for marking the focused pixel may acquire a mean value of a value of a pixel in an $i^{th}$ row and a $j^{th}$ column of the $k^{th}$ image frame and a value of a pixel in an $i^{th}$ row and a $j^{th}$ column of the $(k-1)^{th}$ image frame of the video. The device for marking the focused pixel may further replace the value of the pixel in the $i^{th}$ row and the $j^{th}$ column of the $k^{th}$ image frame with the mean value, to perform inter-frame denoising on the $k^{th}$ image frame.

Assuming that the value of the pixel in the $i^{th}$ row and the $j^{th}$ column of the $k^{th}$ image frame is $Pixel_i(i,j)$, the value of the pixel in the $i^{th}$ row and the $j^{th}$ column of the $(k-1)^{th}$ image frame is $Pixel_2(i,j)$. In this process, the device for marking the focused pixel scans the $k^{th}$ image frame and the $(k-1)^{th}$ image frame pixel-by-pixel. For pixel data in a same location, data of each color channel are averaged to acquire a mean value of the pixel data, $Pixel_{out}(i,j)$, wherein the color channels may be RGB, YcbCr, or the like. The color channels being the RGB is taken as an example for illustration. The mean value $Pixel_{out}(i,j)$ of $Pixel_1(i,j)$ and $Pixel_2(i,j)$ may be calculated according to the following equations:

$$Pixel_{out}(i, j)[R] = (Pixel_2(i, j)[R] + Pixel_1(i, j)[R])/2;$$

$$Pixel_{out}(i, j)[G] = (Pixel_2(i, j)[G] + Pixel_1(i, j)[G])/2;$$

$$Pixel_{out}(i, j)[B] = (Pixel_2(i, j)[B] + Pixel_1(i, j)[B])/2.$$

It can be seen according to the embodiments of the present disclosure that, for pixel data at the same location of the $k^{th}$ image frame and the $(k-1)^{th}$ image frame, the device for marking the focused pixel may average the data of color channels to acquire the mean value of the pixel data.

It is understandable that, in the method for marking a focused pixel according to the embodiments of the present disclosure, the device for marking the focused pixel saves the image frames of the video based on the timing, in response to receiving the video. Upon the inter-frame denoising, the device reads two adjacent image frames based on the timing via a memory controller. For example, the device for marking the focused pixel includes a memory controller, a double data rate synchronous dynamic random access memory (DDR SDRAM), and an inter-frame denoising unit. The memory controller is configured to control the DDR SDRAM to store the image frames of the video based on timing, in response to receiving the video. The memory controller is further configured to read two adjacent image frames based on the timing (such as the $k^{th}$ image frame and the $(k-1)^{th}$ image frame) and send the two adjacent image frames to the inter-frame denoising unit. The inter-frame denoising unit is configured to denoising the $k^{th}$ image frame based on the $(k-1)^{th}$ image frame.

Figure 2:
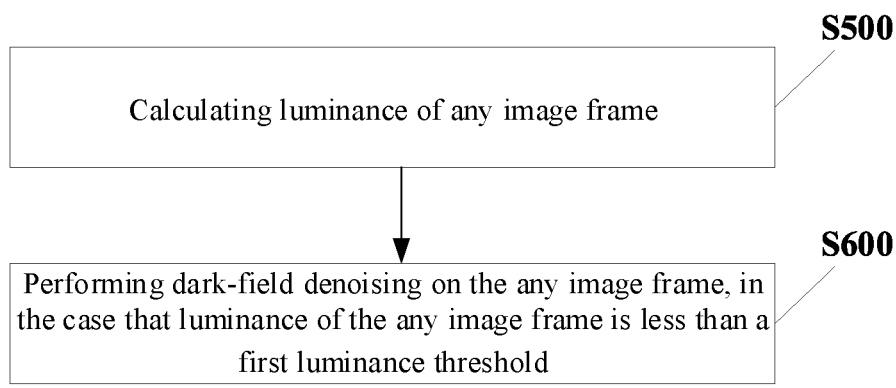
FIG. 2 is a second flowchart of a method for marking a focused pixel according to an embodiment of the present disclosure.

Furthermore, referring to FIG. 2, prior to marking the focused pixel of any image frame in the first image and the second image, the method for marking the focused pixel further includes the following processes.

In S500, luminance of any image frame is calculated.

In some embodiments, S500 includes: acquiring luminance of a plurality of image regions of the any image frame and determining the luminance of the any image frame based on the luminance of the plurality of image regions. The size of the plurality of image regions may be the same or different. In the case that the device for marking the focused pixel determines the luminance of each image region, the device may acquire the luminance of the image region by performing a luminance average calculation on the image region. In the case that the device determines the luminance of the any image frame based on the luminance of the plurality of image regions, the device may acquire the luminance of the any image frame by performing an average calculation on the luminance of all image regions.

In some embodiments, in S500, the device for marking the focused pixel may acquire the luminance of the any image frame by averaging the luminance of the pixels of the any image frame.

In S600, the dark-field denoising is performed on the any image frame, in the case that luminance of the any image frame is less than a first luminance threshold.

In the case that the luminance of the any image frame is less than the first luminance threshold, the any image frame is in a dark field environment. In this case, the device for marking the focused pixel may perform the dark-field denoising to reduce the noise introduced by the dark field environment. In some embodiments, the dark-field denoising includes a median filtering denoising.

In the case that the luminance of any image frame is greater than or equal to the first luminance threshold, the image is in a bright field environment, such that there is no need to perform the dark-field denoising, thereby avoiding the influence of excessive denoising on marking of the focused pixel.

In some embodiments, the device for marking the focused pixel performs the dark-field denoising on the first image in a partition denoising fashion, and S600 includes: performing the dark-field denoising on any image region of any image frame in the case that the luminance of the any image region is less than a second luminance threshold; and not performing, by the device for marking the focused pixel, the dark-field denoising on the any image region in the case that the luminance of the any image region is greater than or equal to the second luminance threshold.

Different regions of the video image are processed respectively in the partition denoising fashion. A filtering denoising is not performed on a high-luminance low-noise region (such as a light source region) in the dark field, and the filtering denoising is performed on a low-luminance high-noise region, such that excessively denoising the image is avoided on the premise of the denoising effect.

The first luminance threshold and the second luminance threshold may be the same or different, which is not limited in the embodiments of the present disclosure. For example, the first luminance threshold may be greater than the second luminance threshold.

In the case that the computational process is in a pipeline design fashion, the device for marking the focused pixel may merely process an image frame input currently, and output a processed image frame in response to processing the image frame. In order to process the preceding image frame, the device for marking the focused pixel may utilize the cache. Since all pixels of the image frame need to be traversed to calculate the luminance of all image regions of an image frame and the luminance of the image frame, the output time of the image frame may elapse. In order to output the processed image at the output time of the image frame, the device for marking the focused pixel may delay the output time of the image frame for one frame. For example, the device for marking the focused pixel may include the memory controller, the DDR SDRAM, and the dark field denoising unit. The memory controller is configured to control the DDR SDRAM to store the image frames of the video based on the timing, in response to receiving the video. The memory controller is further configured to delay each image frame for one frame and fetch the image frame. The dark field denoising unit is configured to perform the above S500 and S600 on the image fetched by the memory controller.

Based on the above method, the image acquired in the dark field environment is optimized, the interference of the noise on marking of the focused pixel is reduced, and the accuracy of determining the focused pixel is improved.

According to the above embodiments, prior to marking the focused pixel of the any image frame, the device for marking the focused pixel may acquire a denoised image by denoising on the any image frame, and determine the focused pixel of the any image frame based on the denoised image. The denoising includes at least one of: performing the inter-frame denoising on the any image frame based on an adjacent image frame of the any image frame of the video, and performing the dark-field denoising on the any image frame in the case that the luminance of the any image frame is less than the first luminance threshold.

It should be noted that the method according to the embodiments of present disclosure may be performed by a single device, such as a computer, a server, or the like. The method according to the embodiments may be applied to a distributed situation and performed by cooperation of multiple devices. In the case that the method is applied to the distributed situation, a device of the multiple devices may perform only one or more processes of the methods, and the multiple devices interact with each other to perform the method mentioned above.

It should be noted that specific embodiments of the present disclosure are illustrated above. Other embodiments are within the scope of the appended claims. In some embodiments, the actions or processes recited in the claims may be performed in a different sequence from the embodiments and still achieve expected result. In addition, the processes in the accompanying drawings do not require a specific sequence or a continuous sequence, as the sequence shown in the accompany drawings, to achieve expected result. In some embodiments, multitask processing and parallel processing may be possible or may be advantageous.

Based on the same inventive concept of any method embodiment mentioned above, one or more embodiments of the present disclosure further provide an apparatus for marking a focused pixel.

Figure 3:
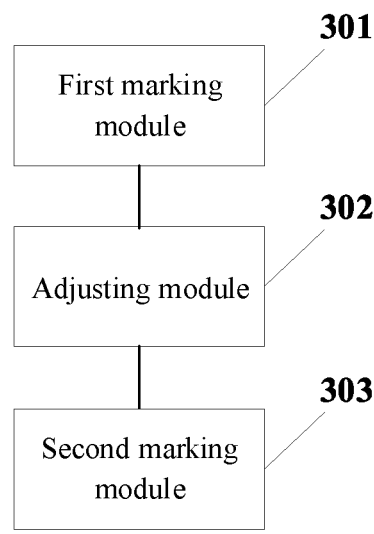
FIG. 3 is a schematic structural diagram of an apparatus for marking a focused pixel according to an embodiment of the present disclosure.

Referring to FIG. 3, the apparatus for marking a focused pixel includes a first marking module 301, an adjusting module 302, and a second marking module 303.

The first marking module 301 is configured to mark a focused pixel of a first image based on a focus threshold.

The adjusting module 302 is configured to adjust the focus threshold in the case that an adjustment condition is satisfied, wherein the adjustment condition includes at least one of: a focus degree of the first image being less than a target focus degree, and the focus degree of the first image being greater than the target focus degree; wherein a focus degree of an image is positively correlated with a number of focused pixels of the image.

The second marking module 303 is configured to mark a focused pixel of a second image based on the adjusted focus threshold.

A similarity between the first image and the second image is greater than a similarity threshold, and a difference between a focus degree of the second image and the target focus degree is less than a difference between the focus degree of the first image and the target focus degree; and a focus parameter of the focused pixel of the first image is greater than the focus threshold, and a focus parameter of the focused pixel of the second image is greater than the adjusted focus threshold; or a focus parameter of the focused pixel of the first image is less than the focus threshold, and a focus parameter of the focused pixel of the second image is less than the adjusted focus threshold.

In some embodiments, the adjusting module 302 is configured to adjust the focus threshold based on a ratio of the target focus degree to the focus degree of the first image.

In some embodiments, in the case that the focus parameter of the focused pixel of the first image is greater than the focus threshold, the adjusted focus threshold G2 is equal to G1/u; or in the case that the focus parameter of the focused pixel of the first image is less than the focus threshold, the adjusted focus threshold G2 is equal to u*G1; wherein u represents the ratio, and G1 represents the focus threshold.

In some embodiments, the apparatus further includes a processing module (not shown in FIG. 3).

The processing module is configured to acquire the focus degree of the first image by performing weighted averaging on focus parameters of pixels of the first image.

In some embodiments, upon the weighted averaging, a weight of the focus parameter of the focused pixel is greater than a weight of a focus parameter of an unfocused pixel, wherein the unfocused pixel is different from the focused pixel.

In some embodiments, the focus parameter is a pixel gradient; and a pixel gradient of the focused pixel of the first image is greater than the focus threshold, and a pixel gradient of the focused pixel of the second image is greater than the adjusted focus threshold.

In some embodiments, the apparatus further includes a receiving module and a first determining module, wherein the receiving module and the first determining module are not shown in FIG. 3.

The receiving module is configured to receive a focus degree instruction, wherein the focus degree instruction indicates the target focus degree.

The first determining module is configured to determine the target focus degree based on the focus degree instruction.

In some embodiments, the first image is a $k^{th}$ image frame of a video, and the second image is a $(k+n)^{th}$ image frame of the video, wherein k≥1 and n≥1.

In some embodiments, in the case that k is greater than 1, the apparatus further includes a denoising module and a second determining module, wherein the denoising module and the second determining module are not shown in FIG. 3.

The denoising module is configured to acquire a denoised image by denoising any image frame prior to marking a focused pixel of the any image frame.

The second determining module is configured to determine the focused pixel of the any image frame based on the denoised image.

The denoising includes at least one of: performing inter-frame denoising on the any image frame, based on an adjacent image frame of the any image frame of the video; and performing dark-field denoising on the any image frame in the case that luminance of the any image frame is less than a first luminance threshold.

In some embodiments, the denoising includes the inter-frame denoising, and the denoising module is configured to: replace a value of each pixel of the any image frame with a mean value corresponding to each pixel. The mean value corresponding to a pixel in an $i^{th}$ row and a $j^{th}$ column of the any image frame is a mean value of a value of the pixel and a value of a pixel in an $i^{th}$ row and a $j^{th}$ column of a preceding image frame of the any image frame, wherein i≥1 and j≥1.

In some embodiments, the denoising includes the dark-field denoising, and the apparatus further includes an acquiring module and a third determining module. However, the acquiring module and the third determining module are not shown in FIG. 3.

The acquiring module is configured to acquire luminance of a plurality of image regions of the any image frame.

The third determining module is configured to determine the luminance of the any image frame based on the luminance of the plurality of image regions.

In some embodiments, the denoising module is configured to perform the dark-field denoising on any image region of the plurality of image regions in the case that the luminance of the any image region is less than a second luminance threshold.

In some embodiments, the dark-field denoising includes a median filtering denoising.

In some embodiments, the denoising includes the interframe denoising and the dark-field denoising, and the interframe denoising and the dark-field denoising are sequentially performed.

For convenient illustration, the above apparatuses are divided into various modules in terms of function and illustrated separately. The functions of the modules according to the one or more embodiments of the present disclosure may be achieved by a same or multiple software and/or hardware.

The apparatus according to the above embodiments is configured to perform the method for marking the focused pixel according to the above embodiments. The apparatus embodiments achieve the same beneficial effects according to the corresponding method embodiments, which are not repeated herein.

Based on the same inventive concept of any method embodiment mentioned above, one or more embodiments of the present disclosure further provide an electronic device. The electronic device is configured to perform the method for marking the focused pixel according to the embodiments of the present disclosure. For example, the electronic device may include a processor, and a memory storing a computer program loadable and runnable by the processor, wherein the processor, when loading and running the computer program, is caused to perform the method for marking the focused pixel as defined in any embodiment of the above embodiments.

Figure 4:
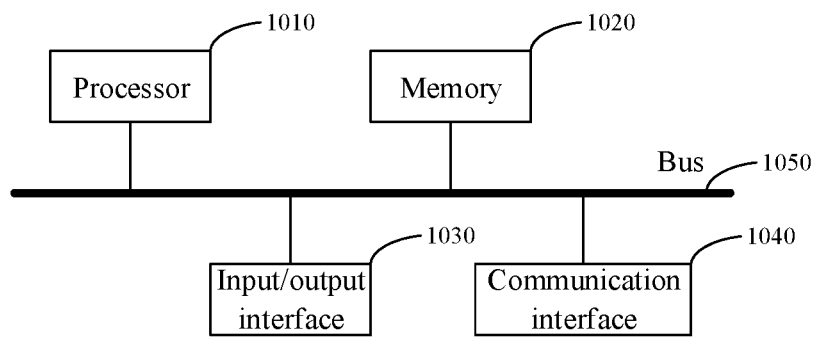
FIG. 4 is a schematic structural diagram of an electronic device according to an embodiment of the present disclosure.

FIG. 4 is a schematic structural diagram of an electronic device according to an embodiment of the present disclosure. The electronic device may include a processor 1010, a memory 1020, an input/output interface 1030, a communication interface 1040, and a bus 1050. The processor 1010, the memory 1020, the input/output interface 1030, and the communication interface 1040 are configured to communicate with each other within the electronic device through the bus 1050.

The processor 1010 may be a universal central processing unit (CPU), a microprocessor, an application specific integrated circuit (ASIC), or one or more integrated circuits. The processor 1010 may be configured to run related programs to implement the technical solutions according to the embodiments of the present disclosure.

The memory 1020 may be a read-only memory (ROM), a random-access memory (RAM), a static storage device, a dynamic storage device, or the like. The memory 1020 may store an operating system and other applications. In the case that the technical solutions according to the embodiments of the present disclosure are implemented by a software or a firmware, related programs are stored in the memory 1020 and runnable by the processor 1010.

The input/output interface 1030 is configured to connect to an input/output module to achieve information input and output. The input/output module may be configured in the device as an assembly (not shown in the accompany drawings), or may be externally connected to the device to provide the corresponding function. The input module may include a keyboard, a mouse, a touch screen, a microphone, various types of sensors, and the like. The output module may include a display, a speaker, a vibrator, an indicator light, and the like.

The communication interface 1040 is configured to connect to a communication module (not shown in the accompany drawings), to achieve the communication of the device with other devices. The communication module may communicate via a wired fashion (e.g., a universal serial bus (USB), a cable, and the like) or a wireless fashion (e.g., mobile network, wireless fidelity (WI-FI), Bluetooth, and the like).

The bus 1050 includes a channel, wherein the channel is configured to transfer information between various components of the electronic device (such as the processor 1010, the memory 1020, the input/output interface 1030, and the communication interface 1040).

It should be noted that although the above electronic device merely shows the processor 1010, the memory 1020, the input/output interface 1030, the communication interface 1040, and the bus 1050, the electronic device may further include other necessary components to perform normal operation. Furthermore, it is understandable for those skilled in the art that the above electronic device may merely include the necessary components to implement the embodiments of the present specification, and not necessarily include all the components shown in the accompany drawings.

The electronic device according to the above embodiments is configured to perform the method for marking the focused pixel according to the above embodiments. The embodiments of electronic device achieve the same beneficial effects according to the corresponding method embodiments, which are not repeated herein.

In some embodiments, the electronic device is a monitor. The monitor may be externally connected to a video camera. The monitor is configured to acquire a view video shot by the video camera, and mark the focused pixel of the viewfinder image of the view video through the above method for marking the focused pixel.

Based on the same inventive concept of any method embodiment mentioned above, one or more embodiments of the present disclosure further provide a chip including at least one of a programmable logic circuit and a program instruction. The chip, when running, is caused to perform the method for markings the focused pixel as defined in any embodiment of the embodiments of the present disclosure. For example, the chip may be a field-programmable gate array (FPGA) chip, a complex programmable logic device (CPLD) chip, or the like.

Based on the same inventive concept of any method embodiment mentioned above, one or more embodiments of the present disclosure further provide a non-transitory computer-readable storage medium storing one or more computer instructions therein, wherein the one or more computer instructions, when loaded and executed by a processor of an electronic device, cause the electronic device to perform the method for marking the focused pixel as defined in any embodiment of the above embodiments.

The computer-readable storage medium in the present embodiments include permanent storage medium, non-permanent storage medium, removable storage medium, non-removable storage medium, and storage medium, implemented by any method or technology, having an information store function. The information may be a computer-readable instruction, a data structure, a module of a program, or other data. In some embodiments, the computer-readable storage medium includes a phase-change random-access memory (PRAM), a static random-access memory (SRAM), a dynamic random-access memory (DRAM), a RAM of another type, a ROM, an electrically erasable programmable read-only memory (EEPROM), a flash memory, or other memories, a compact disc read-only memory (CD-ROM), a digital versatile disc (DVD) or other optical storage devices, a magnetic cassette, a magnetic disk storage, or other magnetic storage devices, or any other non-transmission medium. The computer-readable storage medium may be configured to store information accessed by a computing device.

The one or more computer instructions stored in the storage medium according to the above embodiments are configured to cause the computer to perform the method for marking the focused as defined in any embodiment of the above embodiments. The embodiments of computer-readable storage medium achieve the same beneficial effects according to the corresponding method embodiments, which are not repeated herein.

It is understandable to those of ordinary skill in the art that, the discussions on any embodiment of the above embodiments are only exemplary and are not intended to limit the scope of the present disclosure (including claims). The above embodiments or the technical features in different embodiments may further be combined based on the idea of the present disclosure. The processes may be performed in any sequence. Many other variations on the different aspects of one or more embodiments of the present disclosure are not provided in detail for simplicity.

As used herein, the singular forms "a," "an," and "the" include both singular and plural referents unless otherwise clearly specified. Thus, for example, reference to "a memory storing a computer program" includes one or more memories that include plurality of computer programs as well as a single memory storing a single computer program, reference to "a computer program" includes a combination of computer programs as well as a single computer program, and the like.

In addition, to simplify the explanations and discussions, and make the embodiments of the present disclosure easily understandable, known power/ground connections of the integrated circuit (IC) chips and other components may or may not be shown in the accompanying drawings. In addition, the apparatuses and devices may be shown in the form of block diagram, to make the embodiments of the present disclosure easily understandable. The facts that details of implementing the apparatuses and devices are highly dependent to the platform for implementing one or more embodiments of the present disclosure (that is, the details shall be entirely understandable to those of ordinary skill in the art) are also considered. In the case that specific details (such as circuits) are provided to illustrate the embodiments of the present disclosure, it is obvious to those of ordinary skill in the art that one or more embodiments of the present disclosure may be implemented without or with variations on these specific details. Therefore, the illustrations should be considered as illustrative rather than restrictive.

Although the present disclosure has been illustrated in combination with specific embodiments of the present disclosure, many substitutions, modifications, and variations of the embodiments will be obvious to those of ordinary skill in the art based on the above illustrations. For example, other memory architectures, such as a dynamic RAM (DRAM), may utilized in the discussed embodiments.

One or more embodiments of the present disclosure are intended to cover all such substitutions, modifications and variations within the broad scope of the attached claims. Therefore, any omissions, modifications, equivalent replacements, improvements and the like made within the spirit and principles of the present disclosure should be included within the protection scope of the present disclosure.

What is claimed is:

1. A method for marking focused pixel, comprising:
    marking a focused pixel of a first image based on a focus threshold;
    adjusting the focus threshold in a case that an adjustment condition is satisfied, wherein the adjustment condition comprises at least one of: a focus degree of the first image being less than a target focus degree, and the focus degree of the first image being greater than the target focus degree; wherein the focus degree of the first image is positively correlated with a number of focused pixels of the first image; and
    marking a focused pixel of a second image based on the adjusted focus threshold;
    wherein a similarity between the first image and the second image is greater than a similarity threshold, and a difference between a focus degree of the second image and the target focus degree is less than a difference between the focus degree of the first image and the target focus degree; and
    a focus parameter of the focused pixel of the first image is greater than the focus threshold, and a focus parameter of the focused pixel of the second image is greater than the adjusted focus threshold; or the focus parameter of the focused pixel of the first image is less than the focus threshold, and the focus parameter of the focused pixel of the second image is less than the adjusted focus threshold.

2. The method according to claim 1, wherein adjusting the focus threshold comprises:
    adjusting the focus threshold based on a ratio of the target focus degree to the focus degree of the first image.

3. The method according to claim 2, wherein
    in the case that the focus parameter of the focused pixel of the first image is greater than the focus threshold, the adjusted focus threshold G2 is equal to G1/u; or
    in the case that the focus parameter of the focused pixel of the first image is less than the focus threshold, the adjusted focus threshold G2 is equal to u*G1;
    wherein u represents the ratio, and G1 represents the focus threshold.

4. The method according to claim 1, further comprising:
    acquiring the focus degree of the first image by performing weighted averaging on focus parameters of pixels of the first image.

5. The method according to claim 4, wherein upon the weighted averaging, a weight of the focus parameter of the focused pixel of the first image is greater than a weight of a focus parameter of an unfocused pixel, wherein the unfocused pixel is different from the focused pixel of the first image.

6. The method according to claim 1, wherein a focus parameter is a pixel gradient; and a pixel gradient of the focused pixel of the first image is greater than the focus threshold, and a pixel gradient of the focused pixel of the second image is greater than the adjusted focus threshold.

7. The method according to claim 1, further comprising:
    receiving a focus degree instruction, wherein the focus degree instruction indicates the target focus degree; and
    determining the target focus degree based on the focus degree instruction.

8. The method according to claim 1, wherein the first image is a $k^{th}$ image frame of a video, and the second image is a $(k+n)^{th}$ image frame of the video, wherein k≥1 and n≥1.

9. The method according to claim 8, wherein, in a case that k is greater than 1, the method further comprises:
acquiring a denoised image by denoising any image frame prior to marking a focused pixel of the any image frame;
determining the focused pixel of the any image frame based on the denoised image;
wherein denoising the any image frame comprises at least one of:
performing inter-frame denoising on the any image frame based on an adjacent image frame of the any image frame of the video; and
performing dark-field denoising on the any image frame in a case that luminance of the any image frame is less than a first luminance threshold.

10. The method according to claim 9, wherein the denoising the any image frame comprises the inter-frame denoising; and denoising the any image frame comprises:
replacing a value of each pixel of the any image frame with a mean value corresponding to each pixel;
wherein the mean value corresponding to a pixel in an $i^{th}$ row and a $j^{th}$ column of the any image frame is a mean value of a value of the pixel and a value of a pixel in an $i^{th}$ row and a $j^{th}$ column of a preceding image frame of the any image frame, wherein i≥1 and j≥1.

11. The method according to claim 10, wherein a focus parameter is a pixel gradient; and a pixel gradient of the focused pixel of the first image is greater than the focus threshold, and a pixel gradient of the focused pixel of the second image is greater than the adjusted focus threshold; wherein the adjusted focus threshold G2 is equal to G1/u, u represents a ratio of the target focus degree to the focus degree of the first image, and G1 represents the focus threshold; and
the method further comprises:
receiving a focus degree instruction, wherein the focus degree instruction indicates the target focus degree;
determining the target focus degree based on the focus degree instruction;
acquiring luminance of a plurality of image regions of the any image frame, in response to performing the inter-frame denoising on the any image frame;
determining, based on the luminance of the plurality of image regions, the luminance of the any image frame undergoing the inter-frame denoising;
performing median filtering denoising on any image region of the plurality of image regions in a case that the luminance of the any image frame undergoing the inter-frame denoising is less than a first luminance threshold and a luminance of the any image region is less than a second luminance threshold; and
acquiring the focus degree of the first image by performing weighted averaging on focus parameters of pixels of the first image; wherein upon the weighted averaging, a weight of the focus parameter of the focused pixel of the first image is greater than a weight of a focus parameter of an unfocused pixel, wherein the unfocused pixel is different from the focused pixel of the first image.

12. The method according to claim 9, wherein the denoising the any image frame comprises the dark-field denoising, and the method further comprises:
acquiring luminance of a plurality of image regions of the any image frame; and
determining the luminance of the any image frame based on the luminance of the plurality of image regions.

13. The method according to claim 12, wherein the denoising the any image frame comprises:
performing the dark-field denoising on any image region of the plurality of image regions in a case that the luminance of the any image region is less than a second luminance threshold.

14. The method according to claim 13, wherein the dark-field denoising comprises median filtering denoising.

15. The method according to claim 9, wherein the denoising the any image frame comprises: the inter-frame denoising and the dark-field denoising, and the inter-frame denoising and the dark-field denoising are sequentially performed.

16. A chip comprising a programmable logic circuit programmed to perform the method of claim 1.

17. An electronic device, comprising: a processor and a memory storing a computer program loadable and runnable by the processor, wherein the processor, when loading and running the computer program, is caused to:
mark a focused pixel of a first image based on a focus threshold;
adjust the focus threshold in a case that an adjustment condition is satisfied, wherein the adjustment condition comprises at least one of a focus degree of the first image being less than a target focus degree, and the focus degree of the first image being greater than the target focus degree; wherein the focus degree of the first image is positively correlated with a number of focused pixels of the first image; and
mark a focused pixel of a second image based on the adjusted focus threshold;
wherein a similarity between the first image and the second image is greater than a similarity threshold, and a difference between a focus degree of the second image and the target focus degree is less than a difference between the focus degree of the first image and the target focus degree; and
a focus parameter of the focused pixel of the first image is greater than the focus threshold, and a focus parameter of the focused pixel of the second image is greater than the adjusted focus threshold; or the focus parameter of the focused pixel of the first image is less than the focus threshold, and the focus parameter of the focused pixel of the second image is less than the adjusted focus threshold.

18. The electronic device according to claim 17, wherein the electronic device is a monitor.

19. A non-transitory computer-readable storage medium storing one or more computer instructions therein, wherein the one or more computer instructions, when loaded and executed by a processor of an electronic device, cause the electronic device to:
mark a focused pixel of a first image based on a focus threshold;
adjust the focus threshold in a case that an adjustment condition is satisfied, wherein the adjustment condition comprises at least one of a focus degree of the first image being less than a target focus degree, and the focus degree of the first image being greater than the target focus degree; wherein the focus degree of the first image is positively correlated with a number of focused pixels of the first image; and
mark a focused pixel of a second image based on the adjusted focus threshold;
wherein a similarity between the first image and the second image is greater than a similarity threshold, and a difference between a focus degree of the second image and the target focus degree is less than a difference between the focus degree of the first image and the target focus degree; and a focus parameter of the focused pixel of the first image is greater than the focus threshold, and a focus parameter of the focused pixel of the second image is greater than the adjusted focus threshold; or the focus parameter of the focused pixel of the first image is less than the focus threshold, and the focus parameter of the focused pixel of the second image is less than the adjusted focus threshold.

* * * * *